(12) United States Patent
Otani (10) Patent No.: US 8,698,847 B2
(45) Date of Patent: Apr. 15, 2014

(54) IMAGE DISPLAY APPARATUS, METHOD, PROGRAM, AND RECORDING MEDIUM

(75) Inventor: Hiroshi Otani, Tokyo (JP)

(73) Assignee: Fujifilm Corporation, Tokyo (JP)

( * ) Notice: Subject to any disclaimer, the term of this patent is extended or adjusted under 35 U.S.C. 154(b) by 717 days.

(21) Appl. No.: 12/893,792

(22) Filed: Sep. 29, 2010

(65) Prior Publication Data

US 2011/0074826 A1    Mar. 31, 2011

(30) Foreign Application Priority Data

Sep. 30, 2009    (JP) ................ 2009-227336

(51) Int. Cl.
*G09G 5/14*    (2006.01)
*G06T 3/40*    (2006.01)

(52) U.S. Cl.
CPC ....................... *G06T 3/40* (2013.01)
USPC .......... 345/660; 345/619; 345/629; 345/670; 345/672; 345/698

(58) Field of Classification Search
CPC ....................................................... G06T 3/40
USPC .......... 345/660, 619, 629, 670, 661, 672, 698
See application file for complete search history.

(56) References Cited

U.S. PATENT DOCUMENTS

| | | | |
|---|---|---|---|
| 6,593,944 B1 * | 7/2003 | Nicolas et al. ................. | 715/744 |
| 7,101,283 B2 * | 9/2006 | Okamoto et al. .............. | 463/30 |
| 7,298,733 B2 * | 11/2007 | Sakai et al. ................... | 370/352 |
| 7,441,207 B2 * | 10/2008 | Filner et al. ................... | 715/864 |
| 2001/0049300 A1 * | 12/2001 | Okamoto et al. .............. | 463/30 |
| 2002/0003534 A1 * | 1/2002 | Hayashi et al. ............... | 345/204 |
| 2002/0095475 A1 * | 7/2002 | Krothapalli et al. .......... | 709/217 |
| 2004/0100510 A1 * | 5/2004 | Milic-Frayling et al. ..... | 345/864 |
| 2007/0234206 A1 * | 10/2007 | Yamabuchi et al. .......... | 715/526 |
| 2007/0279437 A1 * | 12/2007 | Morimoto ..................... | 345/629 |

FOREIGN PATENT DOCUMENTS

| | | | | |
|---|---|---|---|---|
| JP | 5-324257 A | 12/1993 | | |
| JP | 6-167967 A | 6/1994 | | |
| JP | 06167967 A | * 6/1994 | ............... | G09G 5/36 |
| JP | 2007-256529 A | 10/2007 | | |
| WO | WO 2005/106628 A1 | 11/2005 | | |

OTHER PUBLICATIONS

Notification of Reason(s) for Rejection dated Feb. 20, 2013, with English translation.

* cited by examiner

*Primary Examiner* — Javid A Amini
(74) *Attorney, Agent, or Firm* — McGinn IP Law Group, PLLC (57) ABSTRACT

According to the image display method, apparatus, and program of the present invention, when a user moves a display location to partially display text that is described in an image over a wide area, the burden of the user in performing return operations with respect to the screen display can be reduced by freely selecting and storing a return destination of the screen from among displayed partial regions in accordance with a user instruction, and thereafter returning to the display of the stored partial region in accordance with an instruction of the user.

13 Claims, 5 Drawing Sheets

IMAGE DISPLAY APPARATUS, METHOD, PROGRAM, AND RECORDING MEDIUM

BACKGROUND OF THE INVENTION

1. Field of the Invention

The present invention relates to movement and return of a displayed portion of an image.

2. Description of the Related Art

Japanese Patent Application Laid-Open No. 2007-256529 points out the complexity of movement operations when viewing text of a length that can not entirely fit on a small screen such as a screen of a portable terminal, and also points out that movement from the end of a paragraph to the start of a paragraph is troublesome when viewing text that includes a plurality of paragraphs. According to the method described in Japanese Patent Application Laid-Open No. 2007-256529, text is analyzed in advance to determine the order for viewing paragraphs or lines, and movement of the screen is controlled in accordance with the determined order.

According to WO 2005/106628, in a state in which an operation screen for operating one frame in a frame page is being displayed, it is determined whether a change occurring to a frame in a page different from the frame being displayed is a change arising from an operation that satisfies a condition that the user explicitly intends to view a different frame. When it is determined that the change is based on an operation that satisfies the condition, the display shifts to a display that shows the page in the entire screen and which notifies the user that the frame is the frame in which the change occurred. Further, a scroll position and a focus position or one of a scroll position and a focus position in an enlarged display state are stored, and when the display returns to enlarged display of the same frame again, the display reverts to the focus position.

SUMMARY OF THE INVENTION

Accompanying the spread of portable terminals and improvements in the processing capacities thereof, it has become common to view documents created with personal computers on portable terminals. Because personal computers have an adequate resolution and screen area, it is possible to view A4 size documents and the like that are often used on a daily basis without any trouble on a personal computer. However, since the resolution and screen area of a portable terminal is extremely small compared to a personal computer, it is troublesome to view even an A4 size document. This is because it is necessary to repeat operations to reduce the display in order to understand the layout and outline of the document and to enlarge the display to read individual sentences.

Further, when reading individual documents, in many cases it is necessary to move the screen display along the line because the length of a single line is larger than the width or height of the screen. Furthermore, since a document is divided into a plurality of lines, after the screen position reaches the end of a line it is necessary to move the screen display to the start of the next line. When reading a long sentence, the number of these movements from the end of one line to the start of another line increases, and feeling of an operational burden quickly increases for the user.

According to Japanese Patent Application Laid-Open No. 2007-256529, there are the problems that a device is required for analyzing text in advance, and also that it is not possible to move to an image portion when viewing a document that includes an image other than text. The technology described in WO 2005/106628 merely restores a focus, and does not decrease the burden of the user to input instructions one by one to return to the start of a line. According to the present invention, operations by a user to move a cursor from the end of a line to the start of a line are reduced.

The present invention provides an image display apparatus that includes: an operation portion that accepts input instructions including a movement instruction, an instruction to store a return location, and an instruction to return that relate to a partial display location of an image; a display portion that, in response to the operation portion accepting the movement instruction, sequentially moves a desired partial region of the image to display a desired state; a storage portion that, in response to the operation portion accepting the instruction to store the return location, stores state information of a return destination relating to a state of a return destination section that is a partial region of an image that is being displayed on the display portion at a time point when input of the instruction to store the return location is accepted; and a control portion that, in response to the operation portion accepting the instruction to return, controls the display portion so as to display the return destination section in accordance with the state information of the return destination that is stored in the storage portion.

The operation portion also accepts an instruction to cancel return; and in response to the operation portion accepting the instruction to return, the storage portion stores state information of a return origin relating to a state of a return origin section that is a partial region of an image that is being displayed on the display portion at a time point when input of the instruction to return is accepted; and in response to the operation portion accepting the instruction to cancel return, the control portion controls the display portion so as to display the return origin section in accordance with the state information of the return origin that is stored in the storage portion.

The state information of the return destination includes at least one of the following items of information: position coordinates of the return destination section in the image, a display size of the return destination section, and an enlargement or reduction ratio of the return destination section with respect to the image.

The state information of the return origin includes at least one of the following items of information: position coordinates of the return origin section in the image, a display size of the return origin section, and an enlargement or reduction ratio of the return origin section with respect to the image.

The present invention also provides an image display method in which an information processing apparatus executes the steps of: accepting input instructions including a movement instruction, an instruction to store a return location, and an instruction to return that relate to a partial display location of an image; in response to accepting the movement instruction, sequentially moving a desired partial region of the image to display a desired state; in response to accepting the instruction to store the return location, storing state information of a return destination relating to a state of a return destination section that is a partial region of an image being displayed at a time point when input of the instruction to store the return location is accepted; and in response to accepting the instruction to return, performing control so as to display the return destination section in accordance with the state information of the return destination that is stored.

The present invention also provides an image display program for causing an information processing apparatus to execute the image display method.

The present invention also provides a non-transitory recording medium in which computer readable code of the image display program of the present invention is stored.

According to the present invention, when a user moves a display location to partially display text that is described in an image over a wide area, the burden of the user in performing return operations with respect to the screen display can be reduced by freely selecting and storing a return destination of the screen from among displayed partial regions in accordance with a user instruction, and thereafter returning to the display of the stored partial region in accordance with an instruction of the user.

DETAILED DESCRIPTION OF THE PREFERRED EMBODIMENTS

First Embodiment

Figure 1:
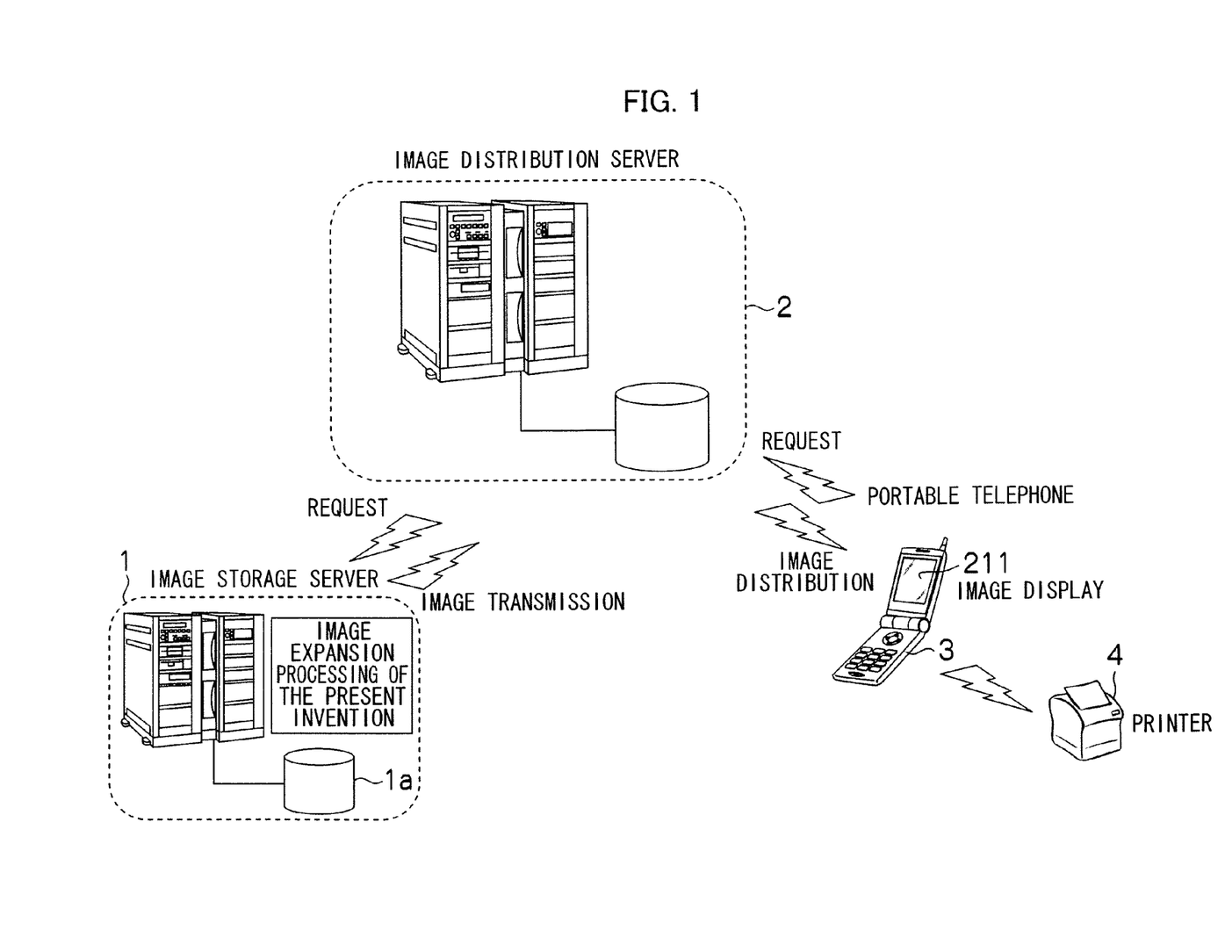
FIG. 1 is a schematic configuration diagram of an image providing system.

FIG. 1 illustrates a schematic configuration of an image providing system according to a preferred first embodiment of the present invention. This system includes an image storage server 1, an image distribution server 2, a portable telephone 3, and a printer 4. The image storage server 1 and the image distribution server 2 are connected by various kinds of networks such as a LAN or the Internet. The image distribution server 2 and the portable telephone 3 are connected by various kinds of networks such as a mobile phone communication network. The portable telephone 3 and the printer 4 are connected by various kinds of networks such as infrared communication.

The image storage server 1 and the image distribution server 2 are constituted by a computer, and include a CPU, a memory (RAM, ROM), a HDD, a communication unit, a data input/output circuit, a display circuit, and an operation apparatus.

When the image distribution server 2 receives a request to distribute an image via the network based on a request to distribute a desired image from the portable telephone 3, the image distribution server 2 requests the image storage server 1 to transmit the image in question via the network.

Upon receiving the request from the image distribution server 2, the image storage server 1 acquires from an image database 1a a compressed recorded image that corresponds to identification information (a hyperlink or image file name or the like) of the image indicated by the request, and transmits the image to the image distribution server 2. The compressed recorded image is in accordance with a compression method such as JPEG, JPEG 2000, or MPEG (moving images), and is compressed image data obtained by dividing the original image data into a plurality of regions and subjecting each individual region to compression processing. In the case of JPEG compression, the original image data is subjected to discrete cosine transformation (DCT), and the bit allocation is determined and quantization performed. In the case of the baseline system, quantized data is encoded using Huffman coding to obtain coded data. In the case of JPEG 2000 compression, the original image data is subjected to discrete wavelet transformation (DWT), and entropy coding is performed by quantization and the EBCOT system.

The image distribution server 2 transmits the image received from the image storage server 1 to the portable telephone 3. The portable telephone 3 can display all or a part of the received image on a display screen 211 or transfer the image to the printer 4.

Figure 2:
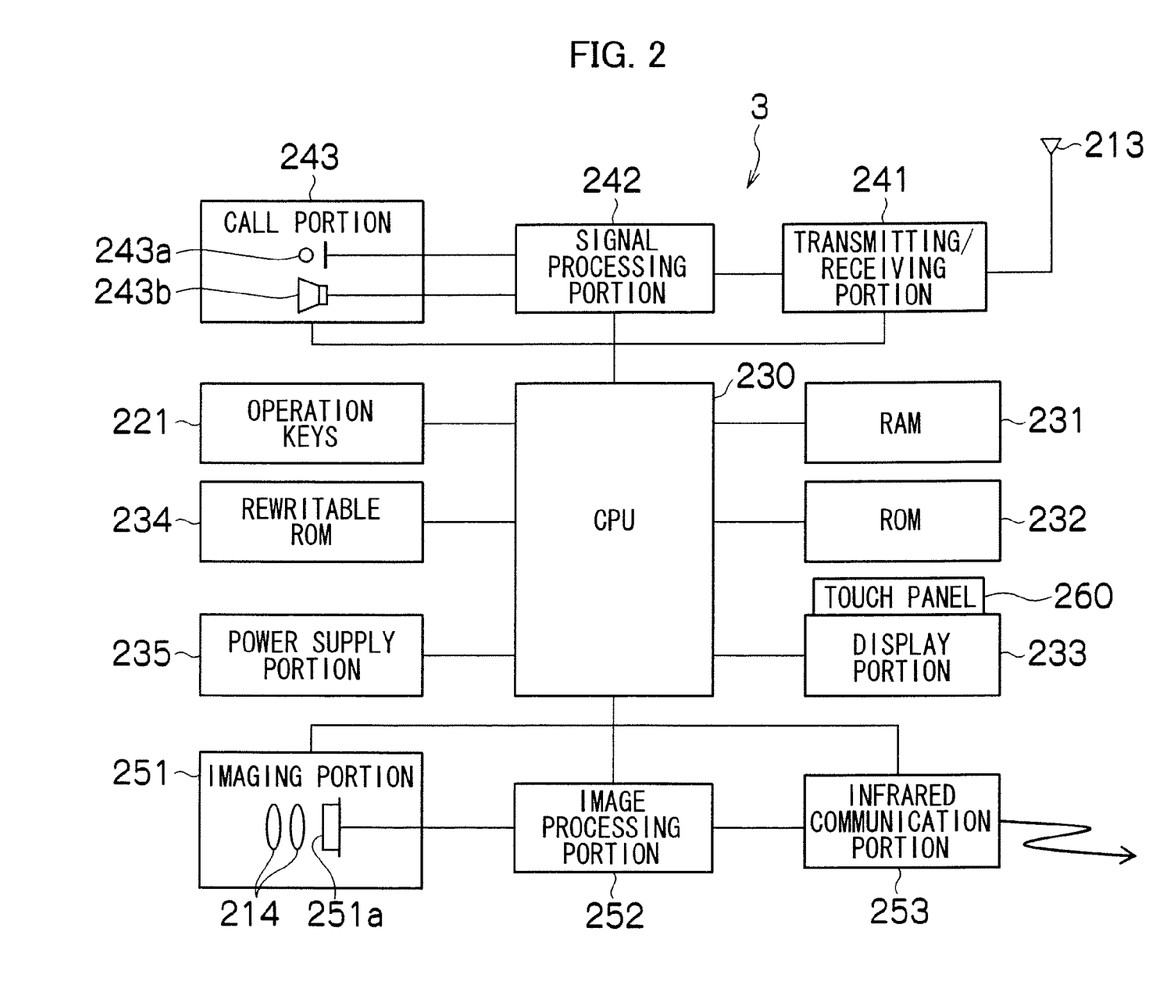
FIG. 2 is a view illustrating the configuration of a portable terminal.

FIG. 2 is a block diagram illustrating the internal configuration of the portable telephone 3. The portable telephone 3 is configured so that all the components of the portable telephone 3 are controlled by a CPU 230. Around the CPU 230 are arranged a RAM 231 that is a volatile memory, a ROM 232 that is a non-volatile memory, a display portion 233 that includes a display screen 211, operation keys 221, a rewritable ROM 234 that is a rewritable non-volatile memory, and a power supply portion 235.

The ROM 232 stores programs and the like that are executed by the CPU 230. The rewritable ROM 234 stores programs that are downloaded by packet communication from the image distribution server 2. The CPU 230 executes programs stored in the ROM 232 or the rewritable ROM 234 to control the operations of each component of the portable telephone 200.

The RAM 231 is utilized as a work area of programs executed by the CPU 230, and is also utilized as a storage region for setting values that relate to the number of pixels of image data that is handled by the portable telephone 200 and image data and the like.

The display portion 233 has a display screen 211. An image in the RAM 231 is displayed on the display screen 211 in accordance with an instruction of the CPU 230.

The aspect ratio of the display screen 211 is arbitrary, and for example is 4:3 or 16:9. The resolution of the display screen 211 is also arbitrary, and for example is 320×180, 320×240, 640×480, 1024×768, 1280×768, or 1920×1080. Information showing the aspect ratio and resolution of the display screen 211 is stored in the ROM 232.

The operation keys 221 and a touch panel 260 fulfill the role of accepting an operation by the user and conveying the contents of the operation to the CPU 230. When the user operates operation keys 221 or the touch panel 260, the CPU 230 controls each component in accordance with the operation in question.

The power supply portion 235 contains a battery (not shown). The power supply portion 235 supplies power of the battery to the CPU 230 and to each component of the portable telephone in accordance with an instruction received from the CPU 230.

The portable telephone 200 also includes an antenna 213, a transmitting/receiving portion 241, a signal processing portion 242, and a call portion 243 as components that fulfill a telephone function. The call portion 243 includes a speaker 243b arranged inside an ear piece 222, and a microphone 243a arranged inside a mouth piece 212.

The transmitting/receiving portion 241 is a circuit element that serves to transmit and receive radio waves using the antenna 213. A signal obtained by the transmitting/receiving portion 241 by receiving radio waves using the antenna 213 is input to the signal processing portion to undergo signal processing, and output as sound from the speaker 243b of the call portion 243. Further, sound that is picked up with the microphone 243a of the call portion 243 undergoes signal processing at the signal processing portion 242 and is transmitted as radio waves from the antenna 213 via the transmitting/receiving portion 241.

The portable telephone 200 is also equipped with a packet communication function. A packet signal received via the antenna 213 and the transmitting/receiving portion 241 undergoes appropriate signal processing at the signal processing portion 242, and thereafter is temporarily stored in the RAM 231. Alternatively, in the case of a downloaded program, the program is stored in the rewritable ROM 234. The packet data that has been temporarily stored in the RAM 231 is displayed on the display screen 211 of the display portion 233 by the CPU 230 in accordance with an instruction received from the operation keys 221. Alternatively, in the case of the downloaded program, the program that has been stored in the rewritable ROM 234 is executed. Data received by packet communication by the portable telephone 200 may be of any kind, and examples thereof include compressed recorded image data, character data, audio data, and programs.

A packet communication document or the like created using the operation keys 221 is temporarily stored in the RAM 231 at the time of creation. The packet communication document is sent to the signal processing portion 242 to undergo signal processing for transmitting in accordance with a transmission instruction from the operation keys 221, and is transmitted as radio waves via the transmitting/receiving portion 241 and the antenna 213.

The portable telephone 200 is also equipped with an imaging portion 251, an image processing portion 252, and an infrared communication portion 253.

The imaging portion 251 includes an imaging lens 214 and an imaging element 251a. The imaging element 251a generates an image signal based on a subject image that is captured through the imaging lens. The image signal obtained with the imaging element 251a is processed at the image processing portion 252 and converted to digital compressed image data which may conform to a variety of standards such as JPEG, JPEG 2000, or MPEG. The resultant digital compressed image data is temporarily stored in the RAM via the CPU 230, and is displayed on the display screen 211 of the display portion 233 in accordance with an operation by the user using the operation keys 221. Alternatively, the digital compressed image data is transferred to an external device such as the printer 4 via the infrared communication portion 253. The infrared communication portion 253 also includes an infrared signal reception function. When the transmitted image data has been received by the printer 4, the infrared communication portion 253 receives an acknowledge signal transmitted from the printer 4 to indicate that the image data has been received.

Thus, according to the portable telephone 3, it is possible to recognize whether or not image data that has been transmitted to the printer 4 has been properly received by the printer 4, by determining whether or not an acknowledge signal is received from the printer 4 within a predetermined time after the image data is transmitted.

In this connection, the term "portable telephone" used herein refers to merely one example of a variety of information terminals such as a notebook-size personal computer, a PDA, and a digital camera. Further, an image that is transmitted to the printer 4 via the infrared communication portion 253 is not limited to an image that originates from the imaging portion 251, and the image may be image data that originates from a compressed recorded image received via the transmitting/receiving portion 241 from the image distribution server 2. The user can arbitrarily select which type of image to transmit to the printer 4 using the operation keys 221.

Figure 3:
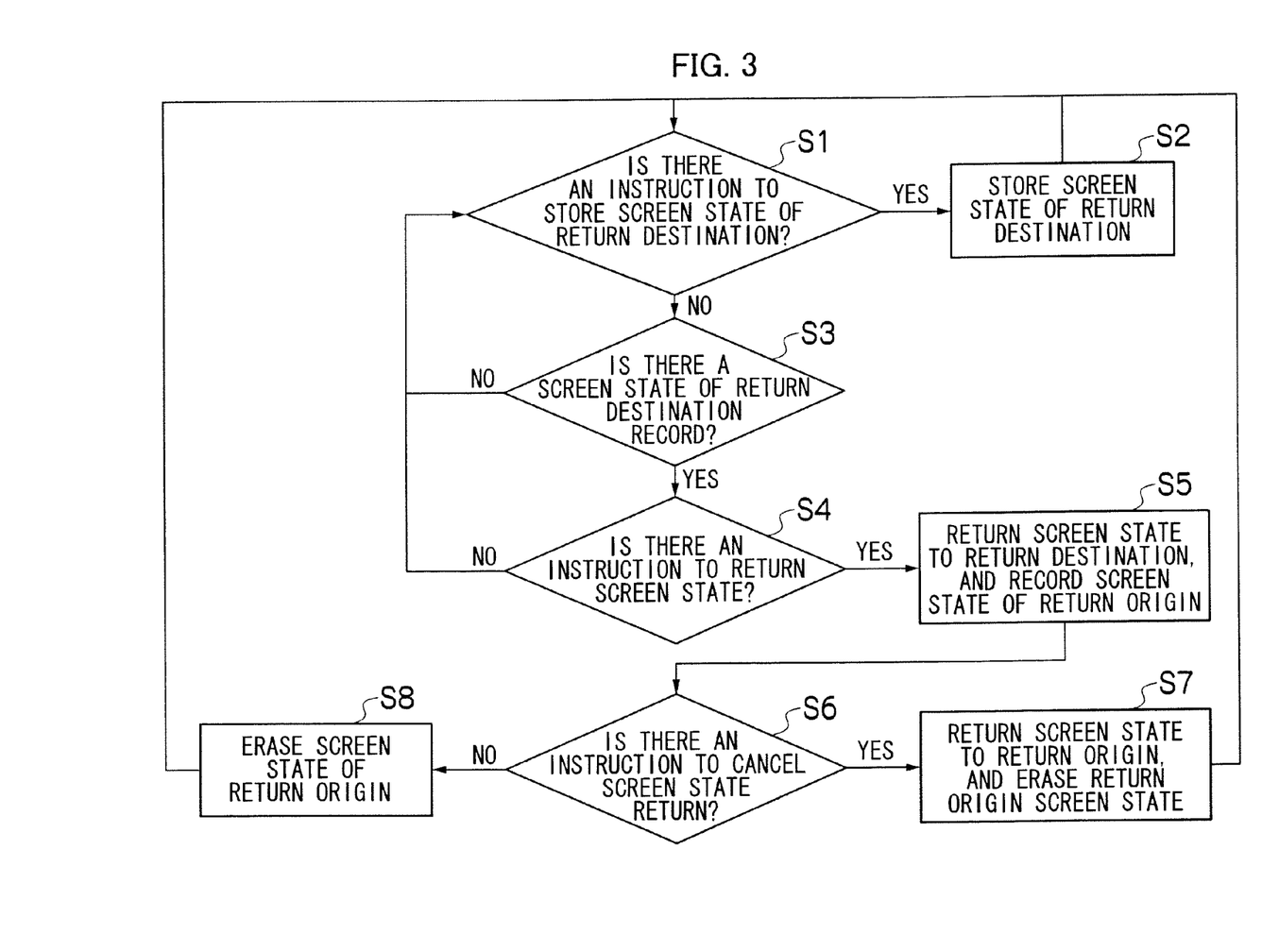
FIG. 3 is a flowchart of image display return processing according to a first embodiment.

FIG. 3 illustrates a flowchart of image display return processing executed by the portable telephone 3. A program for causing the CPU 230 of the portable telephone 3 to execute this processing is stored in a computer-readable storage medium such as the ROM 232. The storage medium may be CDs, DVDs, Hard Disks, etc. depending type of the information terminals. It is assumed as a premise for this processing that the CPU 230 of the portable telephone 3 is displaying a desired partial region (for example, a region designated by reference character I1, I2, or I3 shown in FIG. 4) of an arbitrary still image I (for example, an image I shown in FIG. 4) received from the imaging portion 251 or the image distribution server 2 on the display screen 211. The contents of the still image I are arbitrary, and a moving image may be included as one part thereof. The user can arbitrarily decide which partial region of which image is to be displayed. The CPU 230 determines which partial region the user wishes to display based on a display range movement operation (a scrolling operation or the like) performed using the operation keys 221 or the equivalent thereof (the touch panel 260 or a graphical user interface or the like). The vertical and horizontal sizes of the display portion as well as a magnification ratio can be arbitrarily changed by a magnification ratio changing operation at the operation keys 221 or the equivalent thereof. The CPU 230 trims, expands, or reduces a part of the image in accordance with the vertical and horizontal sizes or magnification ratio specified from the operation keys 221 or the like.

In S1, the CPU 230 determines whether or not an instruction to store screen state of a return destination is input with respect to the partial region that is being displayed. If the CPU 230 determines that the relevant instruction has been input, the operation advances to S2. If the relevant instruction has not been input, the operation advances to S3. The manner in which an instruction to store screen state of a return destination is input is arbitrary. For example, the instruction may be input by pressing an operation key 221 or pressing the touch panel 260 in a state in which a desired partial region is displayed on the display screen 211. The kind of operation key 221 used to input this instruction is arbitrary. For example, the CPU 230 allocates a function of an input key for an instruction to store screen state of a return destination to any key among functions keys, keys of a ten-key numeric keypad, and QWERTY keys, and determines whether or not the instruction has been input by determining whether or not the key to which the function is allocated is pressed in a state in which the desired partial region is displayed. Alternatively, a dedicated key that only accepts input of an instruction to store screen state of a return destination is provided, and the CPU 230 determines whether or not the instruction has been input by determining whether or not the dedicated key is pressed in a state in which a desired partial region is displayed.

A device that accepts an instruction to store screen state of a return destination need not be an operation key 221 and may be a device that is equivalent thereto. The touch panel 260, a touch pad, a scroll wheel, and a graphical user interface such as an icon or button that the CPU 230 displays on the display screen 211 may be mentioned as examples of devices that are equivalent to the operation keys 221.

In particular, when the touch panel 260 has been laminated onto the display screen 211, a user instruction can be sent to the CPU 230 in a similar manner to a key operation by sending the CPU 230 an electrical signal that indicates a pressing position corresponding to screen coordinates of the display screen 211. The CPU 230 distinguishes actions such as a single tap, a double tap, or a tap and drag action (flick action)

with respect to the touch panel 260 on a partial region displayed on the display screen 211. The term "single tap" refers to an input at a single pressing position. The term "double tap" refers to two inputs at different pressing positions. The term "tap and drag (flick action)" refers to using an initially detected pressing position as a point of origin, and then continuously sliding the pressing position as far as a certain other position.

Typically, an instruction to store state of a return destination can be input through the touch panel 260 by a single tap on a partial region of the display screen 211. The operation to input this instruction by the user is similar to an operation to start to suppress a partial region displayed on the portable telephone 3 using a finger of one hand. The determination in S1 can be repeatedly performed periodically.

In S2, the CPU 230 stores state information of a return destination relating to the state of the return destination section that is the partial region being displayed on the display screen 211 at the time point when the CPU 230 determines that an instruction to store screen state of a return destination is input in the RAM 231, and thereafter returns to S1. The state information of the return destination includes at least one of, and preferably all of, the following items of information: the position coordinates of the return destination section in the entire image, the size of the return destination section, and the enlargement or reduction ratio of the return destination section with respect to the entire image. The RAM 231 may store a single item of state information of a return destination or may store a plurality of items of state information of a return destination.

In S3, the CPU 230 determines whether or not state information of a return destination is stored in the RAM 231. If the CPU 230 determines that the state information the return destination is stored in the RAM 231, the processing advances to S4. If the CPU 230 determines that the state information of the return destination is not stored in the RAM 231, the processing returns to S1.

In S4, the CPU 230 determines whether or not an instruction to return a screen state has been input. If the CPU 230 determines that the instruction in question has been input, the processing advances to S5. If the CPU 230 determines that the instruction has not been input, the processing returns to S1. The manner in which this instruction is input is arbitrary. For example, input by pressing a specific key among the operation keys 221 or input by performing an operation to double tap the touch panel 260 in a state in which a desired partial region other than a return destination section is displayed on the display screen 211 may be considered. Since input of an instruction to return a screen state by means of an operation to double tap the touch panel 260 is different to input of an instruction to store return destination state by means of a single tap operation on the touch panel 260, the user can use different fingers to perform the respective operations.

A configuration may also be adopted in which the CPU 230 determines that the user has input an instruction to store return destination state only in a case where, after input of an instruction to store return destination state by a single tap operation, a single tap operation is performed in a state in which the pressing force of the aforementioned single tap continues.

In S5, the CPU 230 uses the RAM 231 to store state information of a return origin that is information relating to a display state of a return origin section (provided that the return origin section differs from the return destination section) that is a partial region that was being displayed on the display screen 211 when the CPU 230 determined that the user input an instruction to return screen state. In response to an instruction to return screen state, the CPU 230 also displays a partial region of an image on the display screen 211 in accordance with the state information of the return destination in the RAM 231 that has been stored in S2. That is, the display screen 211 reverts to a display state that is the same as the display state that existed when the state information of the return destination is stored in S2.

The state information of the return origin stored in the RAM 231 in S5 includes at least one of, and preferably all of, the following items of information: the position coordinates of the return origin section in the entire image, the size of the return origin section, and the enlargement or reduction ratio of the return origin section with respect to the entire image. However, the items of the state information of the return destination and the items of the state information of the return origin must be unified.

In S6, the CPU 230 determines whether or not an instruction to cancel screen state return is input. If the CPU 230 determines that the instruction in question has been input, the processing advances to S7. If the CPU 230 determines that the instruction has not been input, the processing advances to S8. The manner in which the instruction is input is arbitrary. Examples of operations that may be considered to input the instruction include the user depressing an input key for an instruction to cancel a screen state return in a state in which a desired partial region other than the return origin section is displayed on the display screen 211, the user releasing a continuous pressing operation with respect to the touch panel 260, the user making an input to cancel an instruction to store return destination screen state, and the user performing a single tap operation after a double tap operation.

In S7, the CPU 230 displays a partial region of an image on the display screen 211 in accordance with the state information of the return origin that is stored in the RAM 231. More specifically, the display screen 211 reverts to the same display state as the display state when the state information of the return origin is stored in S5. Subsequently, the CPU 230 erases the state information of the return origin from the RAM 231 and the processing returns to S1.

In S8, the CPU 230 erases the state information of the return origin from the RAM 231 and the processing returns to S1. If the CPU 230 determines that a double tap operation has been performed in a state in which the pressing force of a single tap does not continue in S5, the CPU 230 may determine that an instruction to cancel screen state return has been input, and may erase the state information of the return origin from the RAM 231.

Figure 4:
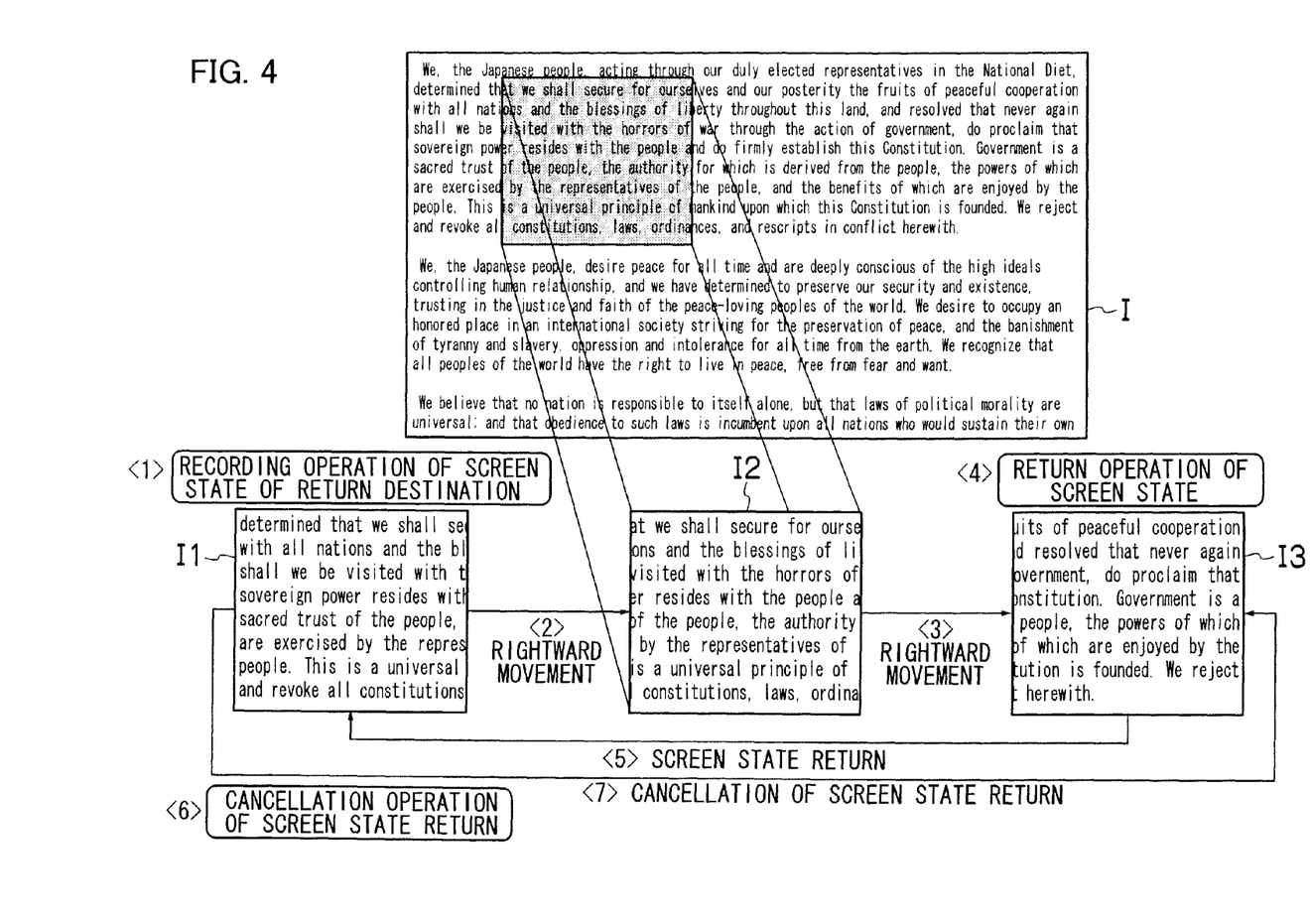
FIG. 4 is a view that illustrates one example of an image and partial regions of the image.

FIG. 4 illustrates a state in which partial regions I1 to I3 that are partial regions of an image I in which text written from left to right is described are displayed in accordance with operations by the user to input display range movement instructions using the operation keys 221 or the like. In this connection, a captured image of a HTML file or a document file in which the relevant text is described can be used as the image I1. The CPU 230 displays the partial region I1 on the left upper side of the screen by default. Thereafter the CPU 230 displays the partial regions I2 and I3 in sequence in response to input of a scrolling operation in the right direction by means of the operation keys 221 or the like. The partial region position used as the default position can be arbitrarily specified using the operation keys 221 or the like.

If an instruction to return a screen state is input in a state in which the partial region I3 is being displayed, the screen display immediately switches to I1 from I3. More specifically, when the user is partially magnifying and displaying text that is described in an image over a wide area and viewing the text while moving the display location, the portable telephone 3 freely stores a desired return destination section based on the displayed partial region in response to an instruction of the user, and can thereafter return to the display of the stored return destination section in response to an instruction of the user. Hence, the burden of the user in performing return operations with respect to the screen display can be reduced. Further, since the screen display immediately switches to the partial region I3 from the partial region I1 when an instruction to cancel screen state return is input to the portable telephone 3 in a state in which the partial region I1 is being displayed, it is also possible to cancel the screen return operation.

Second Embodiment

Figure 5:
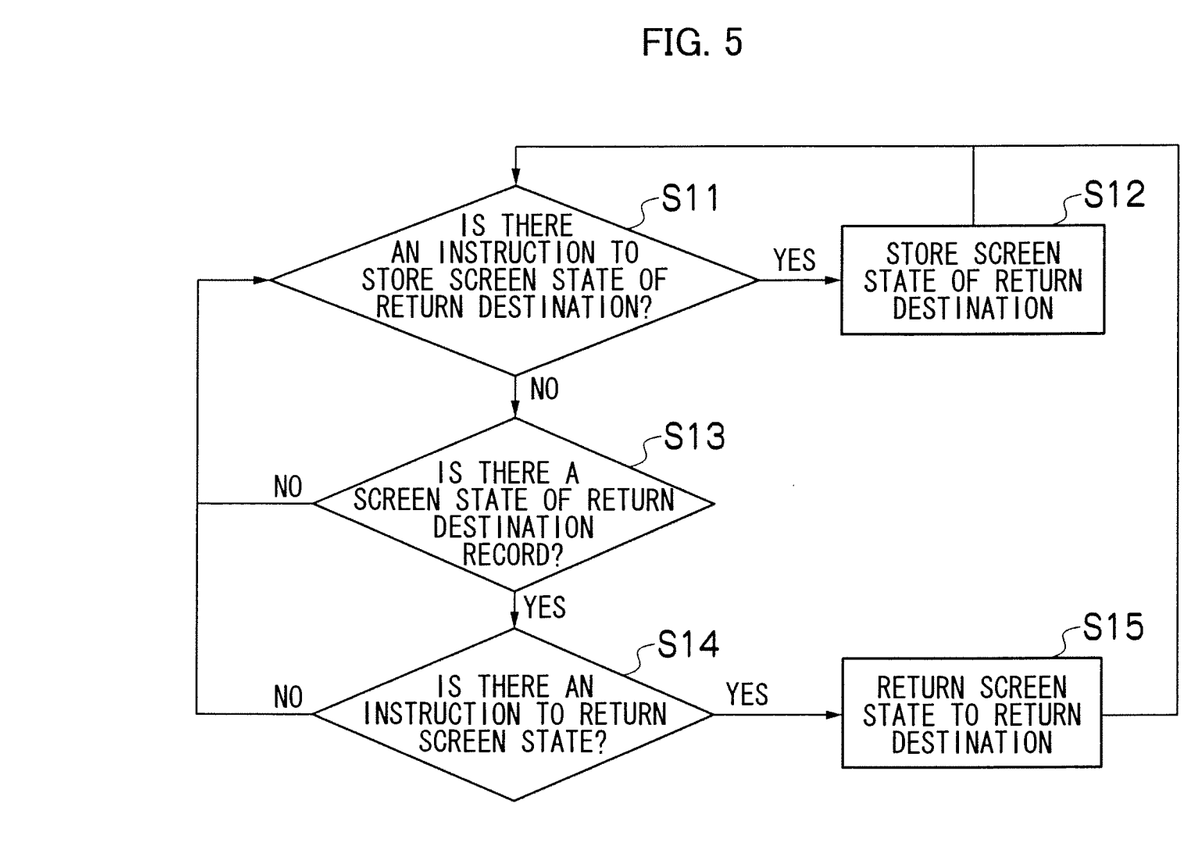
FIG. 5 is a flowchart of image display return processing according to a second embodiment.

The processing of S6 and thereafter in the flowchart of image display return processing of the first embodiment may be omitted. FIG. 5 illustrates a flowchart of the processing in such case. Steps S11 to S15 are the same as steps S1 to S5, respectively. However, in S15, the processing returns to S11 are performing the same processing as in S5.

Third Embodiment

A configuration may be adopted so that in S5 or S15 the CPU 230 does not display a partial region at a position that completely matches the position coordinates included in the information of the return destination, but rather displays a nearby partial region that is in a position obtained by adding a predetermined correction value that is previously stored in the rewritable ROM 234 to the position coordinates included in the information of the return destination. For example, in the case of the text written from left to right as shown in FIG. 4, it is considered that at the time when the partial region I3 is being displayed the user is reading through one line of the document. Accordingly, assuming that the position coordinates of the return destination section included in the information of the return destination of the RAM 231 are (X, Y), in S5 or S15 the CPU 230 may display a nearby partial region that exists at coordinates (X, Y+ΔY) that are obtained by adding a display size ΔY of one line of the document in the longitudinal direction to the position coordinates (X, Y). It is assumed that the state at the time of this display, more specifically, the display size or magnification ratio, is in accordance with the information of the return destination stored in the RAM 231. As a result, the place that the user is expected to read next can be displayed in a user friendly manner. In this connection, a configuration may also be adopted in which the CPU 230 accepts a predetermined correction value that is input from the operation keys 221 or the like, and sets the accepted correction value in the rewritable ROM 234.

A correction value of information of a return destination that the CPU 230 can set in the rewritable ROM 234 in response to an input operation from the operation keys 221 or the like is not limited to coordinates, and may relate to a display size or a magnification ratio. More specifically, a return destination section that is actually displayed need not be completely the same as the partial region that was being displayed when the user input an instruction to store screen state of a return destination, and may be a partial region that exists in the vicinity of the partial region in question.

What is claimed is:

1. An image display apparatus, comprising:
an operation portion that accepts input instructions including a movement instruction, an instruction to store a return location, and an instruction to return that relate to a partial display location of an image;
a display portion that, in response to the operation portion accepting the movement instruction, sequentially moves a desired partial region of the image to display a desired state that is different from the return location;
a storage portion that, in response to the operation portion accepting the instruction to store the return location, stores state information of a return destination relating to a state of a return destination section that is a partial region of an image that is being displayed on the display portion at a time point when input of the instruction to store the return location is accepted; and
a control portion that, in response to the operation portion accepting the instruction to return, controls the display portion so as to display the return destination section in accordance with the state information of the return destination that is stored in the storage portion, wherein:
the operation portion accepts an instruction to cancel return,
in response to the operation portion accepting the instruction to return, the storage portion stores state information of a return origin relating to a state of a return origin section that is a partial region of an image that is being displayed on the display portion at a time point when input of the instruction to return is accepted, and
in response to the operation portion accepting the instruction to cancel return, the control portion controls the display portion so as to display the return origin section in accordance with the state information of the return origin that is stored in the storage portion.

2. The image display apparatus according to claim 1, wherein the state information of the return destination includes at least one of the following items of information: position coordinates of the return destination section in the image, a display size of the return destination section, and an enlargement or reduction ratio of the return destination section with respect to the image.

3. The image display apparatus according to claim 1, wherein the state information of the return origin includes at least one of the following items of information: position coordinates of the return origin section in the image, a display size of the return origin section, and an enlargement or reduction ratio of the return origin section with respect to the image.

4. The image display apparatus according to claim 2, wherein the state information of the return origin includes at least one of the following items of information: position coordinates of the return origin section in the image, a display size of the return origin section, and an enlargement or reduction ratio of the return origin section with respect to the image.

5. An image display method for causing an information processing apparatus to execute, the method comprising:
accepting input instructions including a movement instruction, an instruction to store a return location, and an instruction to return that relate to a partial display location of an image;
in response to accepting the movement instruction, sequentially moving a desired partial region of the image to display a desired state that is different from the return location;
in response to accepting the instruction to store the return location, storing state information of a return destination relating to a state of a return destination section that is a partial region of an image that is being displayed at a time point when input of the instruction to store the return location is accepted; and
in response to accepting the instruction to return, performing control so as to display the return destination section in accordance with the state information of the return destination that is stored, wherein:

the accepting input instructions further accepts an instruction to cancel return, in response to accepting the instruction to return, storing state information of a return origin relating to a state of a return origin section that is a partial region of an image that is being displayed on the display portion at a time point when input of the instruction to return is accepted, and in response to the operation portion accepting the instruction to cancel return, performing control so as to display the return origin section in accordance with the state information of the return origin that is stored.

6. An image display program for causing an information processing apparatus to execute the image display method according to claim 5.

7. A non-transitory recording medium in which computer readable code of the image display program according to claim 6 is stored.

8. The image display apparatus according to claim 2, wherein the storage portion stores a predetermined correction value.

9. The image display apparatus according to claim 8, wherein the display portion displays a nearby partial region that is in a position obtained by adding the predetermined correction value stored in the storage portion to the position coordinates included in the information of the return destination.

10. The image display apparatus according to claim 2, wherein the operation portion further accepts input instructions including a correction value relating to at least one of the position coordinates of the return destination section in the image, the display size of the return destination section, and the enlargement or reduction ratio of the return destination section with respect to the image, and wherein the storage portion stores the correction value.

11. The image display apparatus according to claim 3, wherein the storage portion stores a predetermined correction value.

12. The image display apparatus according to claim 11, wherein the display portion displays a nearby partial region that is in a position obtained by adding the predetermined correction value stored in the storage portion to the position coordinates included in the information of the return destination.

13. The image display apparatus according to claim 3, wherein the operation portion further accepts input instructions including a correction value relating to at least one of the position coordinates of the return destination section in the image, the display size of the return destination section, and the enlargement or reduction ratio of the return destination section with respect to the image, and wherein the storage portion stores the correction value.

* * * * *